United States Patent [19]

Caldarola

[11] Patent Number: 4,891,949

[45] Date of Patent: Jan. 9, 1990

[54] DEVICE FOR STORING AND DISPENSING OF CREAMERS

[76] Inventor: James F. Caldarola, 30 Garford St., Springfield, Mass. 01118

[21] Appl. No.: 271,321

[22] Filed: Nov. 15, 1988

[51] Int. Cl.⁴ .............................................. F25B 21/02
[52] U.S. Cl. ........................................... 62/3.2; 62/3.6
[58] Field of Search ................................. 62/3, 3.2, 3.6

[56] References Cited

U.S. PATENT DOCUMENTS

| | | | |
|---|---|---|---|
| 3,310,953 | 3/1967 | Rait | 62/3 |
| 4,681,611 | 7/1987 | Bohner | 62/3 |
| 4,726,193 | 2/1988 | Burke | 62/3 |
| 4,759,190 | 7/1988 | Trachtenberg et al. | 62/3 |
| 4,783,967 | 11/1988 | Mullen | 62/3 |

Primary Examiner—Lloyd L. King

[57] ABSTRACT

This invention particularly relates to a device for the storage and dispensing of dairy creamers and other perishable items involving the use of thermoelectric cooling modules. In use, this device includes a cooled metal wall means with an opening through which creamers or items to be refrigerated are inserted. A removable container optionally rests inside a refrigerated enclosed space provided by the cooling wall. This removable container facilitates loading of creamers or items to be refrigerated as well as facilitating cleaning of this container. This refrigeration unit can be easily mounted above or below a countertop and is especially suited for commercial use.

15 Claims, 4 Drawing Sheets

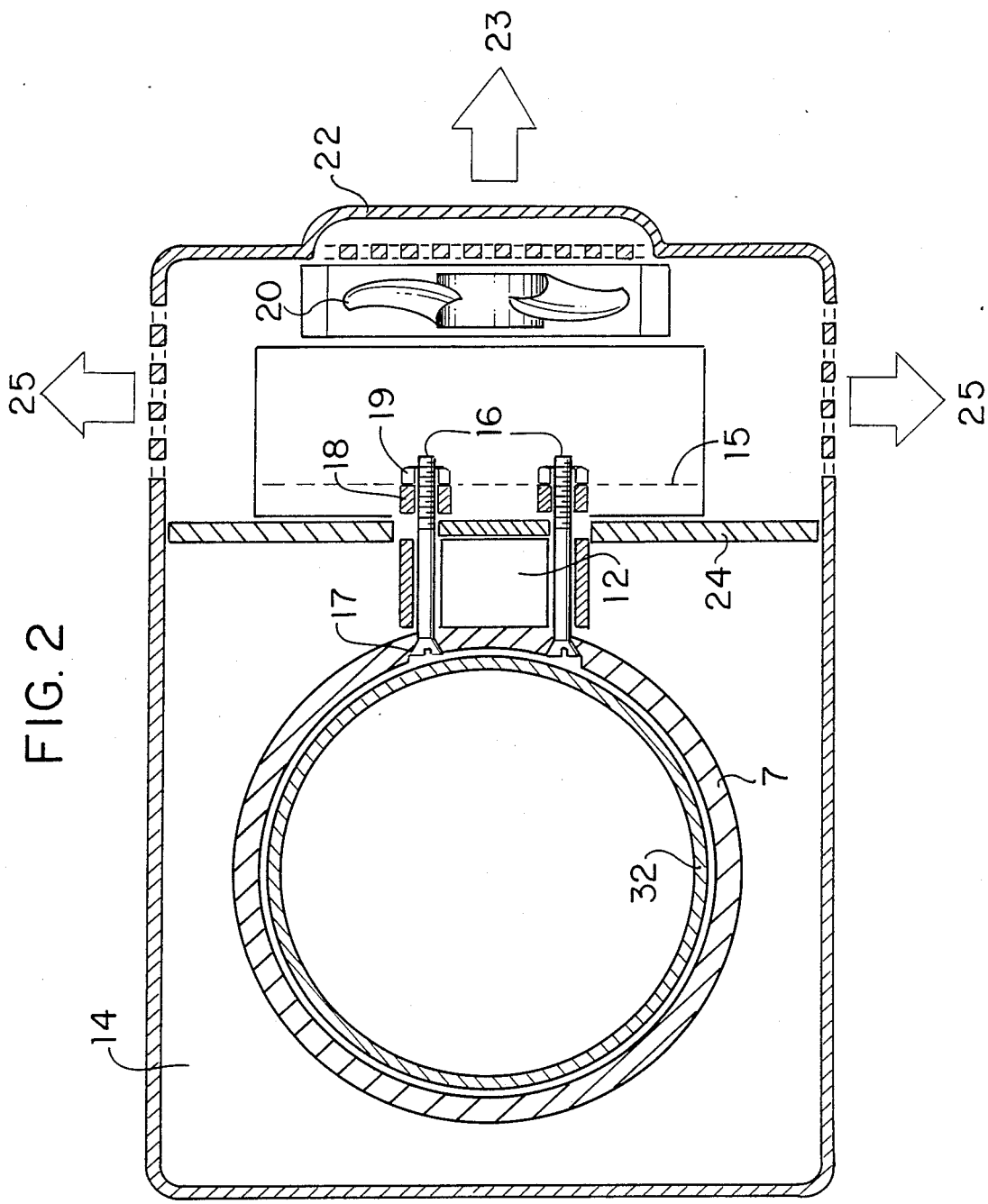

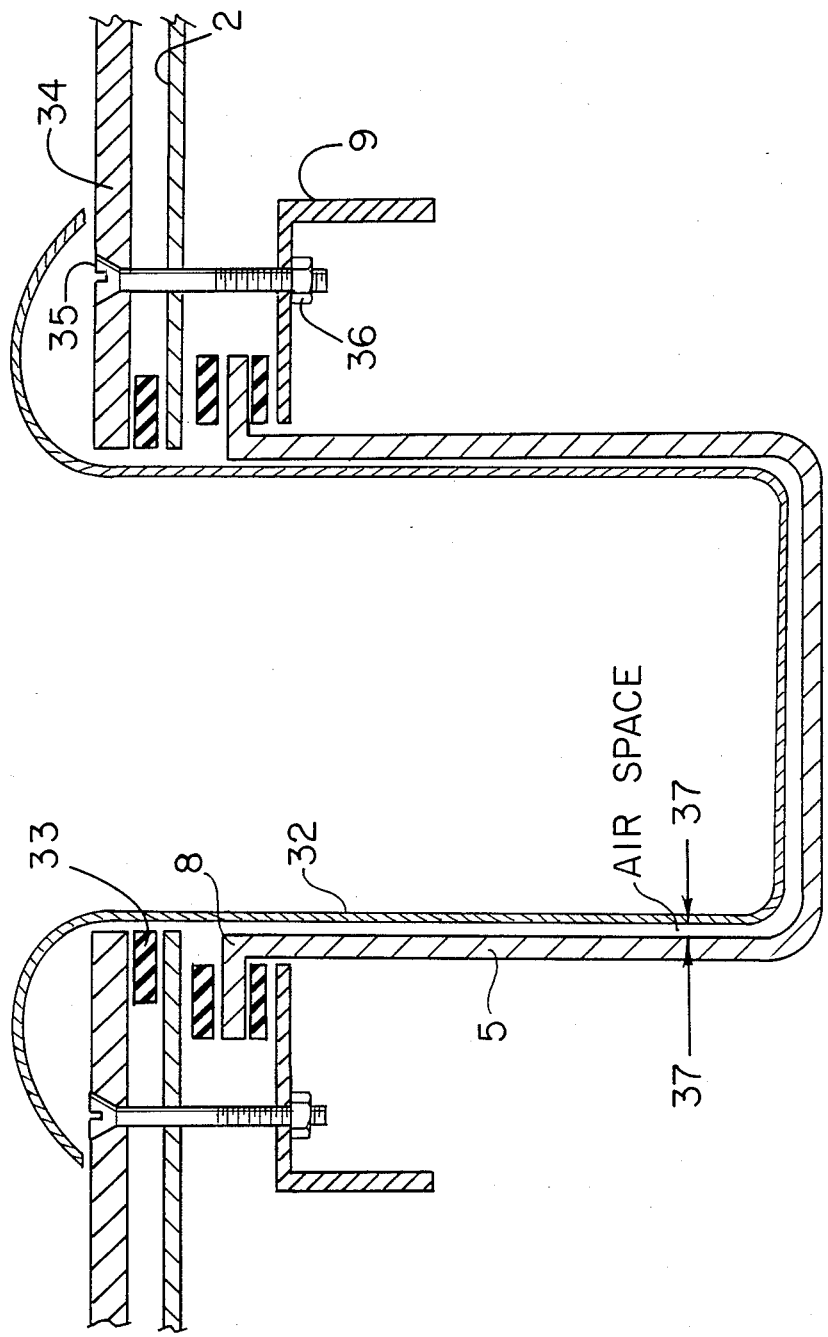

DEVICE FOR STORING AND DISPENSING OF CREAMERS

BACKGROUND OF THE INVENTION

1. Field of the Invention

This invention paticularly relates to the storage and dispensing of diary creamers and other perishable items involving the use of thermoelectric cooling modules.

2. Description of the Prior Art

Portable refrigerators driven by thermoelectric modules is known. Thermoelectric modules typically consist of an array of "couples" composed of alternating P-type and N-type semiconductive material which is primarily Bismuth Telluride. These couples are typically connected in series electrically and in parallel thermally. Upon passage of direct electrical current through the thermoelectric module, heat is pumped from the cold junction to the hot junction at a rate proportional to the direct current applied. Such modules are well known in the art although their usage in the field has been generally limited to situations where compactness, quietness, environmental considerations and overall reliability are particularly important. The aerospace, military and scientific community find application of thermoelectrics. Commercially, however, thermoelectrics is also starting to find growth. Such uses of thermoelectrics is found in recreational vehicles, portable picnic coolers, water/beverage coolers and for butter and cream dispensers.

For the sake of understanding, refrigeration equipment are of the "conduction" type or "forced convention" type. In the forced convection mode of operation, a fan is typically employed to augment heat transfer in the refrigerated space. U.S. Pat. No. 4,726,193 is illustrative of a forced convention type cooler in the form of a picnic box. Dual fans are connected in tandem so that the heat exchanger located within the refrigerated space of the picnic box and the relatively warmer heat exchanger located outside of the box operate with a relatively high velocity of air across their surface. The use of moving air across the heat exchanger surface enhances heat transfer to or from the respective heat exchangers as well as providing uniform temperature distribution in the refrigerated space. "Cold" or hot spots are dramatically reduced when employing moving air in the refrigerated space.

U.S. Pat. Nos. 3,232,063 or 3,088,289 are representative of "conduction" type coolers. In these coolers, the cold side of one or a plurality of thermoelectric modules are directly mounted to a metal surface which contacts the food or beverage to be cooled.

In U.S. Pat. No 3,232,063, an insulated and enclosed unit is equipped with metal shelves toward the rear of the unit which holds the items to be cooled. A door is provided to give ready access to the refrigerated items and to keep the ambient air from otherwise entering the cabinet.

U.S. Pat. No. 3,088,289 illustrates a water cooler employing a thermoelectric module in direct contact with a reservoir of water contained in a vessel.

SUMMARY OF THE INVENTION

It is an therefore and objective to employ thermoelectric heat pumping to provide a reliable, compact and economical means to maintain an inventory of serving sized dairy creamers at safe temperature conditions so as to prevent cream spoilage and the possibility of customer illness and/or customer dissatisfaction which results when using rancid or objectionable cream.

A further objective is to provide a customer with a conveniently located compact unit to store creamers with ready and convenient access to the inventory of creamers without the use of doors or lids which would be a general nuissance in practice.

Another objective is to provide an "open" chamber which contains the creamers and which the customer or user can readily see and expeditiously remove the creamers without adversely the inventory of other creamers in the chamber.

Further, it is an objective to provide the restaurant or catering staff using this invention with a removable type cannister which houses the unused portion of creamers to expedite cleaning of the housing from time to time.

These and other objects and advantages of the present invention will become apparent from a consideration of the following taken in conjunction with the accompanying drawings.

BRIEF DESCRIPTION OF THE DRAWINGS

FIG. 2 is a horizontal sectional view taken along line A of FIG. 1.

FIG. 3a depicts the preferred use of a removable container adapted to the cooling unit of the present invention. Also, means to mount this inventive unit under a table or countertop is illustrated in this figure.

DETAILED DESCRIPTION OF THE INVENTION

Figure 1:
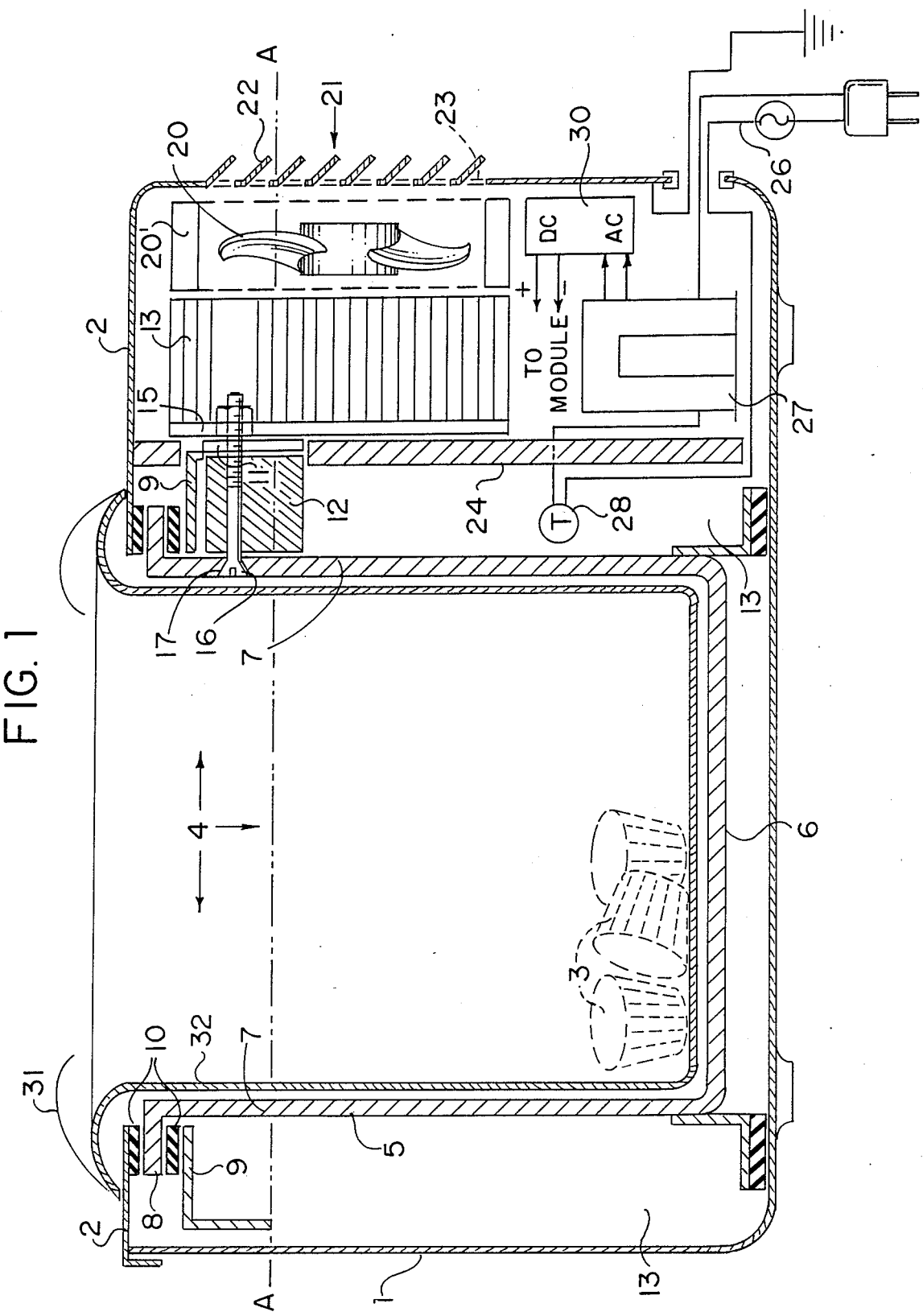
FIG. 1 is a vertical sectional view taken along the inside length of this inventive device.

FIG. 1 illustrates a representative vertical sectional view of the present invention. Referring to FIG. 1, lid 2 is suitably affixed over housing 1 which together enclose the refrigeration unit of the present invention. The invidual portion controlled dairy creamers 3 are placed into refrigerated space 4 to be maintained at temperature preferably at or below about 38 degrees F.

Refrigerated space 4 is chilled by virtue of thermal conduction due to surface contact of the creamers and by natural convection currents induced by conduction wall 5. Bottom wall 6 is preferably an integral part of conduction wall 5 as shown in FIG. 1 or may be even non-conducting ( not illustrated).

Vessel 7 is formed by the joining of bottom wall 6 to side wall 5. Side wall 5 is preferably continuous and of curvilinear cross section to facilitate cleaning. Most preferably, the cross section of vessel 7 is circular for reasons which will become apparent. Note flange area 8 connected to the periphery of wall 5 which permits mounting of cooling vessel 7 inside housing 1 and lid structure 2. Flange 8 can be affixed directly to lid structure 2 or over optional support member 9. Optional member 9 is preferably an angle bracket which is suitably attached to housing 1 and which surrounds and is positioned below flange 8. Insulating means 10 is placed directly over flange 8 to prevent conductive heat transfer from the relatively warmer lid 2 or member 9 to flange 8. Preferably, insulating member 10 is a flange gasket comprised of rubber or an elastomer which further serves as a fluid sealing means to prevent spillage of liquids from entering housing 1. Most preferably, such a gasket is made of a material which is FDA approved. Alternatively, insulating pads or sleeves or the equivalent could be used between vessel 7 and support members 9 to reduce thermal conduction from the members to vessel 7. Still another option would be to employ rigid plastic angle brackets which inherently are non-thermally conductive which would eliminate the need for the use of insulating pads or sleeves. Note that the fasteners employed in the refrigeration unit of the present invention are generally not illustrated for the sake of simplicity.

Conduction wall 5 is preferably directly coupled to the cool side of thermoelectric module 11. Module 11 is preferably mounted to wall 5 by conduction block 12 which is made out of copper or aluminum or alloys thereof which exhibit high thermal conductivities. The function of block 12 is to maintain heat exchanger 13 (which typically is over about 90 degrees F.) an effective distance away from cool wall 5 to prevent short circuiting of heat into wall 5 which would reduce the efficiency of this unit. Insulation material is interposed in space 13 which augments the amount of heat resistance provided by space 13. Any suitable non-toxic insulating materials may be employed in space 13 which include organic or mineral material. For example glass wool or silica aerogel may be used. Preferably, closed cell polyurethane is blown into space 13 after assembly. Still referring to FIG. 1, heat exchanger 13 is affixed to the hot side of thermoelectric module 11 by conventional means known to those in the art. For example, thermally conductive adhesives such as epoxies or solder joints may be employed to form a thermally conductive mechanical bond between the surface of heat exchanger wall 15 and the hot side of module 11. Similarly, these above mentioned means can be employed to affix the cold side of module 11 to conduction block 12 and to affix the conduction block 12 to wall 5. It is preferred, however, to employ thermally conductive silicone based grease which is well known in the art to at least one of the respective heat transfer surfaces of the conduction wall 5 or conducion block 12 or module 11 or heat exchanger 13 to facilitate fastening by fastening means 16, which is is preferably a pair of threaded bolts as clearly illustrated in FIG. 2. Referring now to FIGS. 1 and 2, bolts 16 extend through a recessed hole 17 in wall 5 and then through conduction block 12, through low conduction sleeves 18, and finally through heat exchanger wall 15. Nuts 19 and optionally in combination with lockwasher or equivalent thereof( not illustrated) is threaded onto bolts 16 which impart compressive loadings on wall 5, block 12 module 11 and heat exchanger 13 which maintains this assembly in intimate and secure contact. The heat from module 11 which is, incidentally the sum of the electical power input into module 11 and the heat absorbed by vessel 7, is transferred by conduction into heat exchanger 13. Heat exchanger 13 is preferably a finned type heat exchanger made of copper or aluminum or alloys thereof. The use of aluminum has been found to be perfectly adequate in this application. The heat transferred by module 11 to heat exchanger 13 is preferably dissipated by forced convection via fan 20. Ambient air 21 which is typically about 75 degrees F. is pulled through optional filter 22, and then through aperture(s) 23 (which can be simply a single large perforation) by means of fan 20. Ambient air is then preferably pushed through heat exchanger 13. The resulting moving air is then transferred out of housing 1 by apertures (or hole) 25 as shown in FIG. 2. The function of filter 22 is to mitigate dust accumulation inside housing 1 as well as keeping a splash of water from the possibility of damaging the fan 20. Fan 20 can be selected to operate on either alternating or direct current and at a volumetric flow rate of about 20–150 cubic feet per minute (CFM). Too low a flow rate would not provide adequate heat dissapation for a heat exchanger 13 sized for forced convention and too high a flow rate would typically result in louder operation which could be distracting.

Alternatively, fan 20 can be operated to pull ambient air from apertures 25, through heat exchanger 13 an out of aperture(s) 23. In this instance, filters could be placed upstream of apertures 25 to prevent dust accumulation in housing 1. However, fan 20 would then be exposed to warmer air which in this case would reduce overall fan service life.

Now referring to FIGS. 1 and 2 the location of thermal barrier wall 24 is apparent. The function of this wall is to provide an additional thermal barrier 24 to minimize heat transfer from the moving warm air in housing 1 to insulation space 14.

Thermal barrier 24 wall may comprise part of insulation space 14 in the event that insulation space is composed of solid insulation. However, in the event an air space is provided as insulation space, a solid thermal barrier wall 24 is required.If moisture is allowed to enter insulation space 14 condensation of water will occur on the outside of wall 5 which would be quite problematic. Thermal barrier wall can be constructed of known material known to those skilled in the art. Preferably barrier wall is a rigid, thermally insulating an moisture resistant material. Plasic or metal coated fibreboard, plastic or metal coated polymeric materials are examples of such material. It is most preferred that foil lined expanded polymeric material be employed as the thermal barrier wall.Examples of such material include Thermoply. Again the exact nature of this material is not critical insofar as is water resistant, rigid and relatively insulating. A ¼ inch Thermoply sheet (a foil lined expanded polymer was found to be quite adequate for this purpose. Flexible gasket materials or weatherstripping or caulking materials are preferable employed to seal thermal barrier wall 14 to enclosure 1.

Since this refrigeration unit is preferably employed indoors, a source of direct (DC) current is required.Refering to FIG. 1, alternating current (AC current) is supplied to line 26 to the primary winding of transformer 27. The circuit to input winding of transformer 27 is completed by thermostat 28 when a measured temperature indicative of the average creamer temperature in vessel 7 rises above a predetermined value usually about from 33–37 degrees F. Thermostat 28 can be of the solid state or the bi-metallic type, the bi-metallic type which has been found to be quite adequate. Once the circuit in the primary winding of the transformer is completed, a reduced AC current of from about 3 to about 24 volts (depending on the module 11 requirements) is then input to rectifier/filtering circuit 30 which converts the input AC current to DC current as well as reducing the ripple current to less than 10 per cent. The filtering circuit is preferably of the induction - capacitive type wherein an inductor and capacitor are placed in series with the rectified DC ouput. The capacitance and inductance are, of course, functions of the module inpedance and voltage applied across module 11 as is well known in the art. Rectified and filtered current from rectifier/filtering stage 30 is then passed to thermoelectric module 11 which initates the pumping of heat from the cold side of module 11 to exchanger side 13 of module 11.

FIG. 1 also illustrates optional shroud 31 which further prevents the ingress of outside air into the refrigerated space 4. Shroud 31 is preferably translucent or preferably transparent so as not to obstruct the visual location of the creamers. Although FIG. 1 depicts a shroud 31 of concave cross section, the central axis of symmetry which corresponds to the central axis of symmetry of vessel 7, other arrangements are within the scope of this invention. For example the central axis of symmetry of shroud 37 can be non-colinear or skewed with respect to the central axis of symmetry of vessel 7. Further, if shroud 31 is skewed or not colinear with the central axis of symmetry of vessel 7, the open area in shroud 31 will preferably exceed the top open area of vessel 7. In any event, shroud 31 must necessarily be above the top opening in vessel 7.

FIG. 3a illustrates two separate preferred embodiments of the present invention. Refering now to FIG. 3a, means for installing this inventive unit under a countertop or table is illustrated. Also, the most preferred inner container means 32 is illustrated in FIG. 3a. As with the previous Figures, FIG. 3a shows flange means 8 connected around the periphery of conduction wall 5. When it is convenient to mount the refrigeration unit of the present invention under a table or counter top, gasket means 33 which can be comprised of flexible gasket materials or adhesives (eg. silicone based or the like) are interposed between flange 8 and the bottom of wall 34 which comprises a countertop, for example. Mounting bolts 35 are positioned through countertop 34 and then through lid 2 and finally through support member 9. Nuts or fastening means 36 is permanently affixed to member 9 to facilitate installation. It should be understood that any conventionally suitable means can be employed to affix the present refrigeration unit below a table, countertop, or most surfaces.

Still refering to FIG. 3a, a most preferred expedient relating the facilitated removal of the entire inventory of creamers is illustrated. From time to time, spillage or breakage of the creamers requires that the vessel 7 be cleaned periodically if used to directly house the inventory of creamers. The use of removable inner container 32 as illustrated in FIG. 3, prevents the direct conact of creamers and associated spillage from the inside of vessel 7. The use of container 32 also facilitates the removal of the intire inventory of creamers and permits the working staff to easily transfer the creamers into another refrigerator or to replenish the supply of creamers. Also, the inner container 32 can be cleaned under a faucet or in a sink which is not as convenient as using non-removable vessel 7.

Figure 3B:
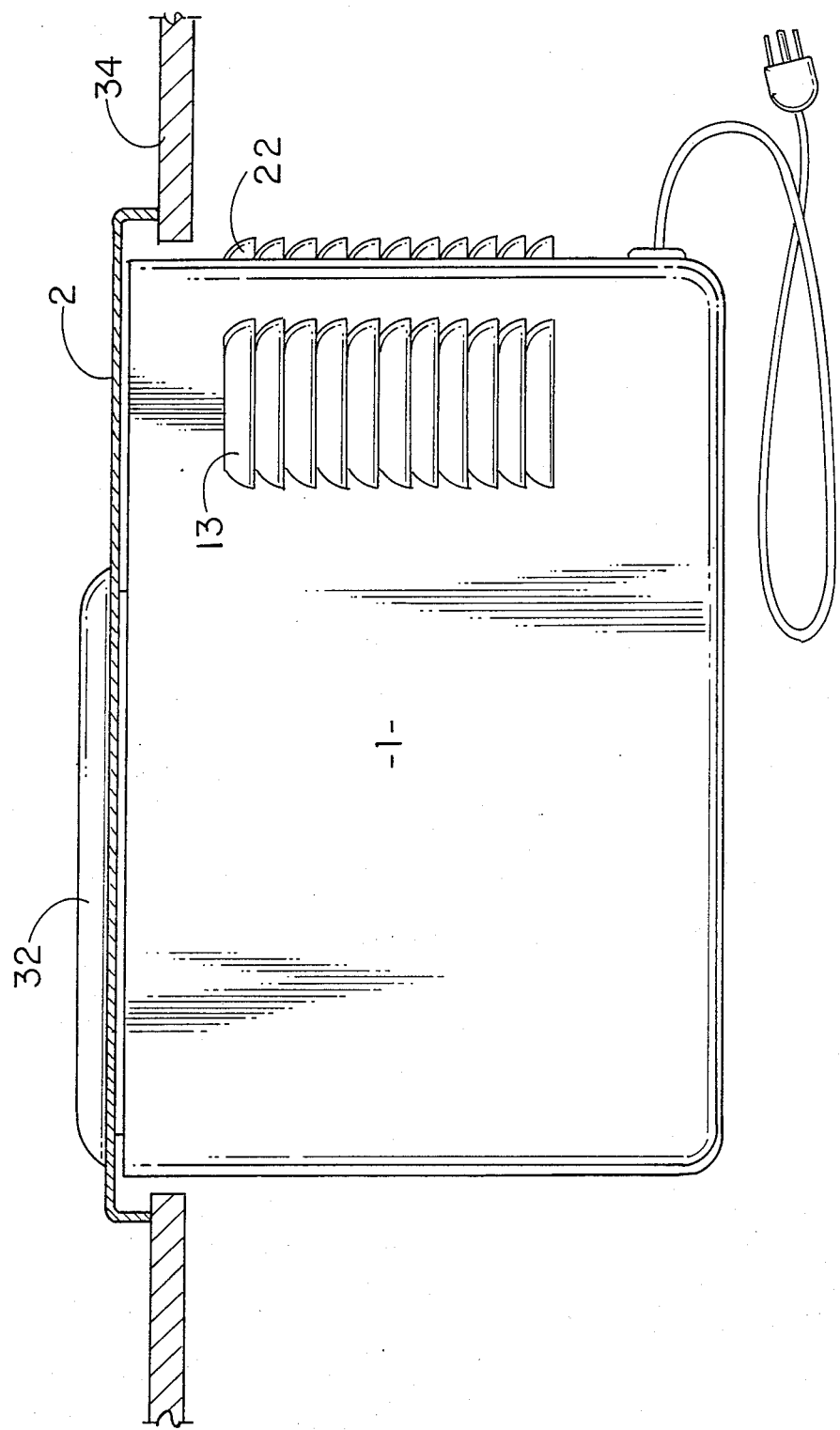
FIG. 3b illustrates another means to install the refrigeration unit of the present invention by simply resting or fastening a lip of the top lid of the unit over the table or countertop.

It is important that removable vessel 32 be in close relationship with vessel wall 5 to permit conduction of heat across gap 37 of FIG. 3b. Gap 37 is less than about 0.25 inch, preferably less than 0.1 inch and more preferably less than about 0.05 inch and most preferably less than about 0.02 inch. Increase clearances between container 32 and wall 5 relates to decreased cooling rates of items stored in container 32. It is therefore an object to keep gap 37 as small as possible and yet allow easy removal of container 32.

Some advantages of this inventive refrigeration device may now be apparent. For instance, creamers within the refrigerated space can be easily noticed and conveniently removed by the user. This small, portable unit lends itself to be placed at or near a coffee station, so that customers or clients need not unnecessarily search or bother the working staff for its location. More importantly, customers using this inventive device are not relegated to using poorly stored cream in makeshift boxes in order to provide a convenient location for the creamers. These and other advantages of the present invention will be made apparent.

Referring back to FIG. 1, the overall characteristic dimensions of vessel 7 are critical and form a part of the present invention. The area of the open end of vessel 7 which is exposed to ambient air, usually at room temperature must be selected to be large enough to permit facilitated access to its contents while being sufficiently small so as to reduce convective heat gain by air infiltration due to drafts or nearby ventilation.

In the present invention vessel 7 is preferably a non-tapered anodized aluminum cylinder with an inside diameter of from about 4 to about 12 inches and most preferably between about 5 to about 8 inches. A cylindrical or elliptical cross section are somewhat prefered over square or polygonal cross sections, since they are more easily cleaned. Cylindrical cross sections are more preferred over all the above mentioned cross sections since they inherently minimize the thermal conduction path between the cool side of module 11 and the portion of the wall furthest from module 11. Minimization of conduction path reduces unwanted temperature gradients in the cylinder cross section for a given wall 5 thickness.

The overall length of vessel 7 is also critical. The overall length of vessel 7 must be sufficient so as to provide enough volume for the storage of creamers for a particular open end diameter. A minimum length above about 3 inches is suitable for this present invention, although a wall 5 length (as measured from the open end to the bottom end 6 between about 5 to about 8 inches is preferred. Any length above 8 inches makes it cumbersome to directly remove the stored creamers by hand. Wall lengths less than about 3 inches are inconvenient since they would not store adequate inventories of creamers using the preferred vessel widths of about 5 to 8 inches. Furthermore, the effective inventory of creamers stored in vessel 7 is reduced by over about a one inch space which preferably should exist between the top of the open end of vessel 7 and the upper surface layer of creamers to mitigate convective heat gain into vessel 7. Too uch heat transfer into the open end of vessel 7 may cause excessive temperature gradients in the in the inventory of creamers. Again, shroud 31 is an optional feature of the present invention to assist the reduction of convective heat gain by this inventive unit.

To summarize the preferred dimensions of this present invention for any vessel shape, use is made of the following equation:

$$D = 4A/P$$

where

D = effective diameter
A = average cross sectional area of vessel 7
P = average inside perimeter of vessel 7

In the instance of the preferred non-tapered circular cross section of the present invention, D reduces to the geometric diameter. In the event of a square cross section, D simply corresponds to the length of one of the sides. In all cases, the ratio of average vessel length to average vessel effective diameter is preferably greater than 0.5 and most preferably greater than about 1.0. Again, the preferred effective diameter is from about 4 to about 12 inches when using a single module for a given cross section and most preferably between about 5 to about 8 inches.

EXAMPLE 1

An aluminum cylinder with the bottom end sealed off was tested using the method of this present invention. The aluminum cylinder measured seven inches in length having an inside diameter of six inches and a wall thickness of ¼ inch. A flat side was machined along the entire length of the cylinder measuing 1.56 inches in width. Silicone based grease was applied to the upper third portion of the machined flat surface. An aluminum block having a 1.56 inch width, 3 inch length and a 1 inch depth was bolted onto the aluminum cylinder, providing a 1 inch distance between the surface of the flat machined surface and the opposite surface of the block to which a Melcor 1.4-127-045-L type thermoelectric module was affixed. A aluminum finned heat exchanger measuring 4 inches by 4 inches having fins spacing of 6 fins per inch, and having fin lengths of 2 inches was mounted to the hot side of the module. Dissipation of heat from the heat exchanger was provided by a low noise fan at 40 CFM. Insulation was provided by mounting a layer of ¼ inch ThermoPly boards within a rectangular aluminum enclosure measuring 9.3 inches in width, 13 inches in length and 8.5 inches deep. A piece of this board was used to partition the finned heat exchanger side of the enclosure from the insulated portion of the enclosure containing the aluminum vessel. All joints between the insulating boards, finned heat exchanger and enclosure were made of silicone type caulking material to form a hermetic seal around the periphery and bottom of the aluminum vessel. Plastic sheeting was mounted around the top open end of the aluminum vessel to form a hermetic seal between the top of aluminum vessel and the top of the enclosure.

Direct electrical current at 12 volts and 6 amperes were applied to the module. Cooling of the empty aluminum cylinder immediately began. With no creamers stored in the vessel and with the top vessel opening exposed to room air at 72 degrees Farenheit, the vessel wall nearest the module measured 20 degrees F while the inside vessel wall opposite this wall measured 23 degrees F.

EXAMPLE 2

Using the device of Example 1 an open aluminum container having a wall thickness of 0.092 inch filled with individual creamers (containing a total of about 1.5 quarts of creamer) was placed within the aluminum vessel of Example 1. About a 0.02 inch gap was provided between the container and the vessel which provided a relatively snug fit and allowed easy removal of the container from the vessel. The unit was activated and in 2.2 hours the inventory of creamers reached 38 degrees F. No significant temperature differences were measured within the inventory of stored creamers.

While Example 2 is illustrative of an object of this invention, it is stressed that in practice, the creamers to be placed in the cooling device of the present invention are already near serving temperatures and are obtained from another location.

In the preferred mode of operation of the present invention, a single module is preferably used. However a distinct possibility within the scope of the present invention would be to situate a plurality of modules in a longitudinal fashion with respect to wall 5. This design has the advantages of providing a somewhat improved temperature distribution and capacity in vessel 7, but at the expense of increased module cost. It is also important to note that conduction block 12 can optionally span up to the entire length of wall 5 which could improve temperature distributions to about the same extent. The conduction block 12 in this or any instance can be attached to wall 5 using conventional mounting methods or alternatively, can be an integral part of wall 5 by extruding wall 5 along with conduction block section 12.

In the event wall 5 is extruded, a bottom wall means 6 should be attached to wall 5 to form a vessel 7. Bottom wall means 6 is preferably, however an integral part of wall means 5. However, it is within the scope of this invention that it may be made out of plastic or other non-metallic material which is water resistant.

The use of more of these units along the outside periphery of wall 5 would reduce the required thickness of wall 5, since less lateral conduction of heat would be required. However, this would be a more expensive alternative, since more modules would be required and the use of a more complicated heat exchanger geometry or heat exchanger network would be necessary. Further, since the thickness of a thermoelectric module is about ⅛ inch, the use of a plurality of modules around the periphery of wall 5 to cool this wall would also mean that the warmer side of module 11 would be in close proximity to the cool wall. Insulation of these additional heat sources from cooling wall 5 would very difficult and inefficient with respect to the present invention wherein there is preferably only one hot side of a module to maintain thermally insulated from wall 5.

I claim:

1. A cooling and storage device for the dispensing of creamers equipped with side wall means, said side wall means operatively connected thermally to the cooling side of at least one thermoelectric module,
   said side wall means positioned substantially in a vertical orientation and of sufficient thickness and thermal conductivity to maintain less than about a 10 degree F differential in temperature between the coolest and the warmest portion of said side wall means,
   said side wall means when viewed from the vertical being substantially of closed cross-section,
   a bottom wall means connected to the bottom of said side wall means to form a vessel the inside of said vessel which defines a refrigerated space,
   an open vessel end which is positioned substantially opposite said bottom,
   a removable container means having an open end in which said creamers are placed,
   said removable container means placed substantially within said refrigerated space in said vessel.
2. The device of claim 1 wherein a gap is formed between said removable container means and said side wall.
3. The device of claim 2 wherein said gap is less than about 1/4 inch said gap comprised of air.
4. The device of claim 2 wherein said gap is filled with a non-toxic fluid.
5. The device of claim 1 wherein an open shroud is placed over said open vessel end to reduce the influx of warmer ambient air into said vessel.

6. The device of claim 5 wherein said open shroud is transparent or translucent so as not to visually obstruct the user from the vessel contents.

7. The device of claim 2 wherein an upper lip portion of said removable container forms a shroud over said open vessel end.

8. The device of claim 1 with means adapted to affix said device to the underside of a second wall means said wall means, said second wall means provided with an opening which is positioned substantially above said open vessel end.

9. The device of claim 8 wherein a gasket means is placed between said underside of said second wall means and said side wall means.

10. The device of claim 1 wherein said device is inserted in an opening in a second wall means comprising a table or countertop and which is retained by at least a portion of underside of a lid said lid which is fastened to said device.

11. The device of claim 1 wherein said side wall which connects said open vessel end and said bottom wall is of sufficient vertical length relative to the surface area of said open end to enclose an inventory of said creamers to maintain the heat gain from the surrounding air to said open vessel end less than the heat which is removed by said enclosed space when the temperature of said enclosed space is above about 32 degrees F.

12. The device of claim 1 wherein the inside diameter of said enclosure is from about 5 to about 12 inches, said length of said cooling wall is over about 4 inches and the thickness of said cooling wall exceeds about ¼ inch.

13. The device of claim 1 wherein an insulation space is provided around the side of said cooling wall which is opposite to said refrigerated space which is hermetically sealed.

14. The device of claim 1 wherein said insulation space is comprised of air and a water resistant thermal barrier means is provided which partitions said insulation space from the relatively warmer atmosphere proximate to the warmer, heat rejection side of said thermoelectric module.

15. The device of claim 1 wherein themostatic control means are operatively affixed to said vessel means to deactivate electrical current supplied to said module to maintain said enclosed space above about 32 degrees F. to prevent freezing of said items.

* * * * *